(12) United States Patent
Ross et al.

(10) Patent No.: US 7,840,322 B2
(45) Date of Patent: Nov. 23, 2010

(54) METHOD AND SYSTEM FOR IMPLEMENTING VEHICLE PERSONALIZATION

(75) Inventors: Steven J. Ross, Livonia, MI (US); Stephen C. Habermas, Needham, MA (US); Christopher L. Oesterling, Troy, MI (US)

(73) Assignee: General Motors LLC, Detroit, MI (US)

( * ) Notice: Subject to any disclaimer, the term of this patent is extended or adjusted under 35 U.S.C. 154(b) by 971 days.

(21) Appl. No.: 10/654,301

(22) Filed: Sep. 3, 2003

(65) Prior Publication Data
US 2004/0044454 A1    Mar. 4, 2004

Related U.S. Application Data

(63) Continuation-in-part of application No. 10/193,799, filed on Jul. 12, 2002, now abandoned.

(51) Int. Cl.
*G06F 7/00* (2006.01)
(52) U.S. Cl. .................... 701/36; 701/24; 701/45; 701/49; 701/54; 340/988; 455/152.1; 455/151.1
(58) Field of Classification Search ............ 701/49, 701/36, 209–213, 20, 24, 45, 54; 715/788; 340/988; 455/152.1, 41, 152, 151.1
See application file for complete search history.

(56) References Cited

U.S. PATENT DOCUMENTS 6,088,653 A * 7/2000 Sheikh et al. ............... 701/214
6,493,743 B2 * 12/2002 Suzuki ....................... 709/203

(Continued)

FOREIGN PATENT DOCUMENTS
CN        101098342 A  *  1/2008

DE    102007029597 A1 *  2/2008

OTHER PUBLICATIONS

The Virtual Automation Lab-Web based teaching of automation engineering concepts; Buhler, D.; Kuchlin, W.; Grubler, G.; Nusser, G.; Engineering of Computer Based Systems, 2000. (ECBS 2000) Proceedings. Seventh IEEE International Conference and Workshopon the; Apr. 3-7, 2000 pp. 156-164; Digital Object Identifier 10.1109/ECBS.2000.839873.*
Asynchronous web-based patient-centered home telemedicine system; Lau, C.; Churchill, R.S.; Kim, J.; Matsen, F.A., Ill; Yongmin Kim; Biomedical Engineering, IEEE Transactions on; vol. 49, Issue 12, Part 1, Dec. 2002 pp. 1452-1462 Digital Object Identifier 10.1109/TBME.2002.805456.*
From location databases to pervasive catalog; Chrysanthis, P.K.; Zadorozhny, V.I.; Database and Expert Systems Applications, 2002. Proceedings. 13th International Workshop on; Sep. 2-6, 2002 pp. 739-744.*
PDAs in medical education and practice; Smordal, O.; Gregory, J.; Langseth, K.J.; Wireless and Mobile Technologies in Education, 2002. Proceedings. IEEE International Workshop on; Aug. 29-30, 2002 pp. 140-146; Digital Object Identifier 10.1109/WMTE.2002. 1039237.*

(Continued)

*Primary Examiner*—Cuong H Nguyen
(74) *Attorney, Agent, or Firm*—Dierker & Associates, P.C.

(57) ABSTRACT

The present invention provides a method for providing vehicle settings to a telematics unit in a mobile vehicle that includes receiving a vehicle settings update signal at a call center from the telematics unit and sending vehicle settings from the call center to the telematics unit. The method may additionally include implementing the vehicle settings in the mobile vehicle. The method may further include sending an update flag signal from the call center to the telematics unit. The method may additionally include receiving at least one user preference at the call center via a web portal interface. The step of receiving at least one user preference may further include sending an update flag signal from the call center to the telematics unit responsive to receiving the at least one user preference at the call center via the web portal interface.

5 Claims, 6 Drawing Sheets

U.S. PATENT DOCUMENTS

| | | | |
|---|---|---|---|
| 6,505,780 B1* | 1/2003 | Yassin et al. | 235/492 |
| 6,647,328 B2* | 11/2003 | Walker | 701/36 |
| 6,873,905 B2* | 3/2005 | Endo et al. | 701/202 |
| 7,039,708 B1* | 5/2006 | Knobl et al. | 709/227 |
| 7,106,843 B1* | 9/2006 | Gainsboro et al. | 379/191 |
| 7,149,782 B1* | 12/2006 | Duperrouzel et al. | 715/788 |
| 7,650,229 B2* | 1/2010 | Dorfstatter et al. | 701/117 |
| 2002/0007391 A1* | 1/2002 | Suzuki | 709/203 |
| 2002/0049535 A1* | 4/2002 | Rigo et al. | 701/211 |
| 2003/0181162 A1* | 9/2003 | Matula | 455/13.3 |
| 2003/0182360 A1* | 9/2003 | Mocek et al. | 709/203 |
| 2004/0044454 A1* | 3/2004 | Ross et al. | 701/33 |
| 2004/0204829 A1* | 10/2004 | Endo et al. | 701/202 |
| 2006/0041370 A1* | 2/2006 | Gault et al. | 701/115 |
| 2007/0142988 A1* | 6/2007 | Ziehr et al. | 701/49 |
| 2007/0244628 A1* | 10/2007 | Rockett et al. | 701/117 |
| 2007/0299565 A1* | 12/2007 | Oesterling | 701/1 |
| 2008/0004788 A1* | 1/2008 | Dorfstatter et al. | 701/117 |
| 2008/0039983 A1* | 2/2008 | Oesterling et al. | 701/2 |
| 2008/0077310 A1* | 3/2008 | Murlidar et al. | 701/117 |
| 2009/0164053 A1* | 6/2009 | Oesterling | 701/2 |
| 2009/0171684 A1* | 7/2009 | Samolinski et al. | 705/1 |
| 2009/0248222 A1* | 10/2009 | McGarry et al. | 701/2 |
| 2009/0248235 A1* | 10/2009 | Hering et al. | 701/31 |
| 2009/0248236 A1* | 10/2009 | Schwinke | 701/33 |
| 2009/0248302 A1* | 10/2009 | Harkenrider et al. | 701/213 |
| 2009/0325612 A1* | 12/2009 | Oesterling et al. | 455/466 |
| 2010/0161167 A1* | 6/2010 | Leyerle | 701/29 |

OTHER PUBLICATIONS

Agent-based system for mobile commerce; Wei Qiang; Hinny Kong; Pe Hin; Parallel and Distributed Processing Symposium., Proceedings International, IPDPS 2002, Abstracts and CD-ROM; Apr. 15-19, 2002 pp. 196-200.*

Customisable off-line Web browsing with mobile software agents; Yew, A.; Pavlou, G.; Service Portability and Virtual Customer Environments, 2000 IEEE; Dec. 1, 2000 pp. 102-108; Digital Object Identifier 10.1109/SPVCE.2000.934168.*

Coexistence of ZigBee wireless sensor networks and Bluetooth inside a vehicle; de Francisco, R. et al.; Personal, Indoor and Mobile Radio Communications, 2009 IEEE 20th International Symposium on; Digital Object Identifier: 10.1109/PIMRC.2009.5449771; Publication Year: 2009, pp. 2700-2704.*

A Compact Multifunction Automotive Antenna; Henderson, R.I. et al.; Antennas and Propagation, 2007. EuCAP 2007. The Second European Conference on; Publication Year: 2007, pp. 1-5.*

Demonstration of Tight Optical Integration (TOI) algorithm using field data; Arthur, T. et al.; Position, Location and Navigation Symposium, 2008 IEEE/ION; Digital Object Identifier: 10.1109/PLANS.2008.4570065; Publication Year: 2008, pp. 744-751.*

A Proposed Intelligent Vehicle Telematics Service System (IVTS); Qing-quan Li et al.; ITS Telecommunications Proceedings, 2006 6th International Conference on; Digital Object Identifier: 10.1109/ITST.2006.289036; Publication Year: 2006, pp. 866-869.*

Staffing a call center with interactive voice response units and impatient calls; Jinting Wang et al.; Service Operations and Logistics, and Informatics, 2008. IEEE/SOLI 2008. IEEE International Conference on; vol. 1; Digital Object Identifier: 10.1109/SOLI.2008.4686449; Publication Year: 2008, pp. 514-519.*

GPU-based Real-Time Execution of Vehicular Mobility Models in Large-Scale Road Network Scenarios; Perumalla, K.S. et al.; Principles of Advanced and Distributed Simulation, 2009. PADS '09. ACM/IEEE/SCS 23rd Workshop on; Digital Object Identifier: 10.1109/PADS.2009.22; Publication Year: 2009, pp. 95-103.*

Technical aspects of implementing a telecare system; Berian, D. et al.; Computational Cybernetics and Technical Informatics (ICCC-CONTI), 2010 International Joint Conference on; Digital Object Identifier: 10.1109/ICCCYB.2010.5491293 Publication Year: 2010, pp. 237-241.*

An Examination of the Public Transport Information Requirements of Users; Brian Caulfield et al.; Intelligent Transportation Systems, IEEE Transactions on; vol. 8, Issue: 1; Digital Object Identifier: 10.1109/TITS.2006.888620 Publication Year: 2007, pp. 21-30.*

Environment generation for validating event-driven software using model checking; Tkachuk, O. et al.; Software, IET vol. 4, Issue: 3; Digital Object Identifier: 10.1049/iet-sen.2009.0017; Publication Year: 2010, pp. 194-209.*

Web-based vehicle routing system using wireless communication techniques; Wang Jiang-qing et al.; Computing, Communication, Control, and Management, 2009. CCCM 2009. ISECS International Colloquium on; vol. 4 Digital Object Identifier: 10.1109/CCCM.2009.5267578; Publication Year: 2009, pp. 498-500.*

Integrating Agents and Web Services into Cooperative Design Platform of Vehicle Headlights; Tingting Fu et al.; Software Engineering, Artificial Intelligence, Networking, and Parallel/Distributed Computing, 2007. SNPD 2007. Eighth ACIS International Conference on; vol. 1; Digital Object Identifier: 10.1109/SNPD.2007.*

Towards a REST-style architecture for networked vehicles and sensors; Pinto, J.; Martins et al..; Pervasive Computing and Communications Workshops (PERCOMWorkshops), 2010 8th IEEE International Conference on; Digital Object Identifier: 10.1109/PERCOMW.2010.5470531; Publication Year: 2010, pp. 745-750.*

RD 453002 A, Jan. 2002, RD, Anon.*

Coexistence of ZigBee wireless sensor networks and Bluetooth inside a vehicle; de Francisco, R. et al.; Personal, Indoor and Mobile Radio Communications, 2009 IEEE 20th International Symposium on; Digital Object Identifier: 10.1109/PIMRC.2009.5449771; Publication Year: 2009, pp. 2700-2704.*

A Compact Multifunction Automotive Antenna; Henderson, R.I. et al.; Antennas and Propagation, 2007. EuCAP 2007. The Second European Conference on; Publication Year: 2007, pp. 1-5.*

Demonstration of Tight Optical Integration (TOI) algorithm using field data; Arthur, T. et al.; Position, Location and Navigation Symposium, 2008 IEEE/ION; Digital Object Identifier: 10.1109/PLANS.2008.4570065; Publication Year: 2008, pp. 744-751.*

A Proposed Intelligent Vehicle Telematics Service System (IVTS); Qing-quan Li et al.; ITS Telecommunications Proceedings, 2006 6th International Conference on; Digital Object Identifier: 10.1109/ITST.2006.289036; Publication Year: 2006, pp. 866-869.*

Staffing a call center with interactive voice response units and impatient calls; Jinting Wang et al.; Service Operations and Logistics, and Informatics, 2008. IEEE/SOLI 2008. IEEE International Conference on; vol. 1; Digital Object Identifier: 10.1109/SOLI.2008.4686449; Publication Year: 2008, pp. 514-519.*

GPU-based Real-Time Execution of Vehicular Mobility Models in Large-Scale Road Network Scenarios; Perumalla, K.S. et al.; Principles of Advanced and Distributed Simulation, 2009. PADA '09. ACM/IEEE/SCS 23rd Workshop on; Digital Object Identifier: 10.1109/PADA.2009.22; Publication Year: 2009, pp. 95-103.*

Technical aspects of implementing a telecare system; Berian, D. et al.; Computational Cybernetics and Technical Informatics (ICCC-CONTI), 2010 International Joint Conference on; Digital Object Identifier: 10.1109/ICCCYB.2010.5491293; Publication Year: 2010, pp. 237 - 241.*

An Examination of the Public Transport Information Requirements of Users; Brian Caulfield et al.; Intelligent Transportation Systems, IEEE Transactions on; vol. 8, Issue: 1; Digital Object Identifier: 10.1109/TITS.2006.888620; Publication Year: 2007, pp. 21-30.*

* cited by examiner

METHOD AND SYSTEM FOR IMPLEMENTING VEHICLE PERSONALIZATION

PRIORITY

This application claims priority as a continuation-in-part application to U.S. patent application Ser. No. 10/193,799 filed Jul. 12, 2002, now abandoned the entirety of which is incorporated by reference herein.

FIELD OF THE INVENTION

This invention relates generally to wireless communications with a mobile vehicle. More specifically, the invention relates to a method and system for implementing parameter and function modifications of components within a mobile vehicle.

BACKGROUND OF THE INVENTION

The opportunity to personalize features in a mobile vehicle is ever increasing as the automobile is being transformed into a communications and entertainment platform as well as a transportation platform. Many vehicles now have hundreds of personalization settings such as seat and mirror behavior, door lock/unlock behavior, radio station present selections, climate controls, custom button configurations and theft alarm settings. With projections that by 2006 almost all new American cars will have some level of telematics service, most vehicles will support customization or personalization of wireless vehicle communication, networking, maintenance and diagnostic services.

Controller systems may be configured or updated in a manner similar to software updates. Even liquid crystal (LCD) displays on the dashboard may be reconfigurable with changes on which data is on the center screen and which is relegated to side panels. For example, it is possible to rearrange dashboard displays for the speedometer, global positioning system (GPS), map navigation, cell phone, two-way radio, maps, radio presets, and mirror and seating behavior settings.

Many of these personalization settings are non-intuitive vehicle-only interfaces, such as, for example requiring a user to set them through a dashboard display or a combination of key fob button strokes. The present invention advances the art of vehicle personalization.

SUMMARY OF THE INVENTION

One aspect of the invention includes a method for providing vehicle settings to a telematics unit in a mobile vehicle. The method includes receiving a vehicle settings update signal at a call center from the telematics unit and sending vehicle settings from the call center to the telematics unit.

In accordance with another aspect of the invention, a computer readable medium storing a computer program includes: computer readable code for processing a received vehicle settings update signal from the telematics unit and computer readable code for sending vehicle settings from a call center to the telematics unit.

In accordance with yet another aspect of the invention, a system for providing vehicle settings for a telematics unit in a mobile vehicle is provided. The system includes means for receiving a vehicle settings update signal at the call center from the telematics unit. Means for sending vehicle settings from the call center to the telematics unit is also provided.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
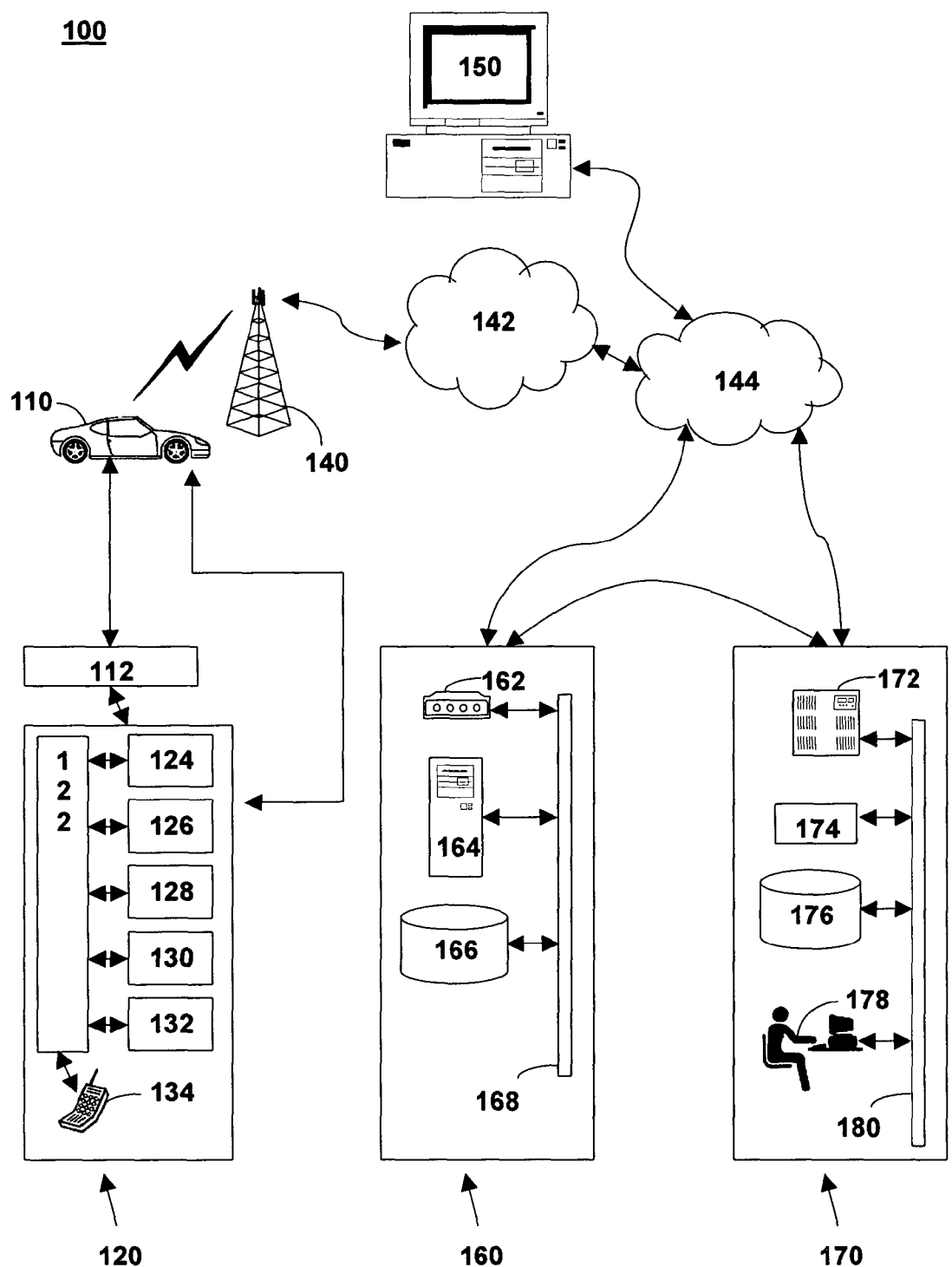
FIG. 1 illustrates one embodiment of a system for personalizing settings of an in-vehicle telematics unit and associated components, in accordance with the current invention.

FIG. 1 illustrates one embodiment of system for personalizing settings of an in-vehicle telematics unit and associated components, in accordance with the present invention at 100.

Vehicle personalization system 100 for personalizing settings of an in-vehicle telematics unit and associated components includes a mobile vehicle 110, a vehicle communication bus 112, a telematics unit 120, one or more wireless carrier systems 140, one or more communication networks 142, one or more land networks 144, one or more client, personal or user computers 150, one or more web-hosting portal 160, and one or more call centers 170. In one embodiment, mobile vehicle 110 is implemented as a mobile vehicle equipped with suitable hardware and software for transmitting and receiving voice and data communications.

Telematics unit 120 includes a digital signal processor (DSP) 122 connected to a wireless modem 124, a global positioning system (GPS) unit 126, an in-vehicle memory 128, a microphone 130, one or more speakers 132, and an embedded or in-vehicle mobile phone 134. In one embodiment, DSP 122 is implemented as a microcontroller, controller, host processor, or vehicle communications processor. In another embodiment, DSP 122 is implemented as a processor working in conjunction with a central processing unit (CPU) performing the function of a general purpose processor. In an example, the CPU is implemented as a XScale™ processor available from Intel® Corp. of Santa Clara, Calif. GPS unit 126 provides longitude and latitude coordinates of the vehicle. In-vehicle mobile phone 134 is a cellular-type phone, such as, for example an analog, digital, dual-mode, dual-band, multi-mode or multi-band cellular phone.

DSP 122 executes various computer programs that control programming and operational modes of electronic and mechanical systems within mobile vehicle 110. DSP 122 controls communications between telematics unit 120, wireless carrier system 140, and call center 170. In one embodiment, a voice-recognition application is installed in DSP 122 that can translate human voice input through microphone 130 to digital signals. DSP 122 generates and accepts digital signals transmitted between telematics unit 120 and a vehicle communication bus 112 that is connected to various electronic modules in the vehicle. In one embodiment, these digital signals activate the programming mode and operation modes, as well as provide for data transfers. In this embodiment, signals from DSP 122 are translated into voice messages and sent out through speaker 132.

Mobile vehicle 110, via a vehicle communication bus 112, sends signals to various units of equipment and systems within mobile vehicle 110 to perform various functions such as unlocking a door, opening the trunk, setting personal comfort settings, and calling from telematics unit 120. In facilitating interactions among the various communication and electronic modules, vehicle communication bus 112 utilizes bus interfaces such as controller-area network (CAN), International Organization for Standardization (ISO) Standard 9141, ISO Standard 11898 for high-speed applications, and ISO Standard 11519 for lower speed applications.

Mobile vehicle 110, via telematics unit 120, sends and receives radio transmissions from wireless carrier system 140. Wireless carrier system 140 is implemented as any suitable system for transmitting a signal from mobile vehicle 110 to communication network 142.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144.

Land network 144 connects communication network 142 to user computer 150, web-hosting portal 160, and call center 170. In one embodiment, land network 144 is a public-switched telephone network. In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connects wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or user computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within mobile vehicle 110. In operation, a driver utilizes user computer 150 to initiate setting or resetting of user-preferences for mobile vehicle 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a bus system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, user computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a driver at user computer 150 to telematics unit 120 in mobile vehicle 110. Web server 164 sends to or receives from one or more databases 166 data transmissions via bus system 168. Web server 164 includes computer applications and files for managing and storing personalization settings supplied by the driver, such as door lock/unlock behavior, radio station present selections, climate controls, custom button configurations and theft alarm settings. For each user, the web server potentially stores hundreds of preferences for wireless vehicle communication, networking, maintenance and diagnostic services for a mobile vehicle.

In one embodiment, one or more web servers 164 are networked via bus system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, prescribing data and/or verbal communications to and from telematics unit 120 in mobile vehicle 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more bus systems 180.

Switch 172 of call center 170 connects to land network 144. Switch 172 transmits voice or data transmissions from call center 170, and receives voice or data transmissions from telematics unit 120 in mobile vehicle 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more bus systems 180.

Communication services manager 174 is any suitable hardware and software capable of providing requested communication services to telematics unit 120 in mobile vehicle 110. Communication services manager 174 sends to or receives from one or more communication services databases 176 data transmissions via bus system 180. Communication services manager 174 sends to or receives from one or more communication services advisors 178 data transmissions via bus system 180. Communication services database 176 sends to or receives from communication services advisor 178 data transmissions via bus system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the user via user computer 150, web-hosting portal 160, and land network 144. Communication services manager 174 transmits user-preference and other data to telematics unit 120 in mobile vehicle 110 through wireless carrier system 140, communication network 142, land network 144, voice and data switch 172, and bus system 180. Communication services manager 174 stores or retrieves data and information from communication services database 176. Communication services manager 174 may provide requested information to communication services advisor 178.

In one embodiment, communication services advisor 178 is implemented as a real advisor. In another embodiment, communication services advisor 178 is implemented as a virtual advisor. In an example, a real advisor is a human being in verbal communication with a user or subscriber in mobile vehicle 110 via telematics unit 120. In another example, a virtual advisor is implemented as a synthesized voice interface responding to requests from telematics unit 120 in mobile vehicle 110.

Communication services advisor 178 provides services to telematics unit 120 in mobile vehicle 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

Mobile vehicle 110 initiates service requests to call center 170 by sending a voice or digital-signal command to telematics unit 120 which in turn, sends an instructional signal through wireless modem 124 or a voice call through wireless carrier system 140. The instructional signal and voice call are routed through communication network 142, and land network 144, to call center 170.

Figure 2:
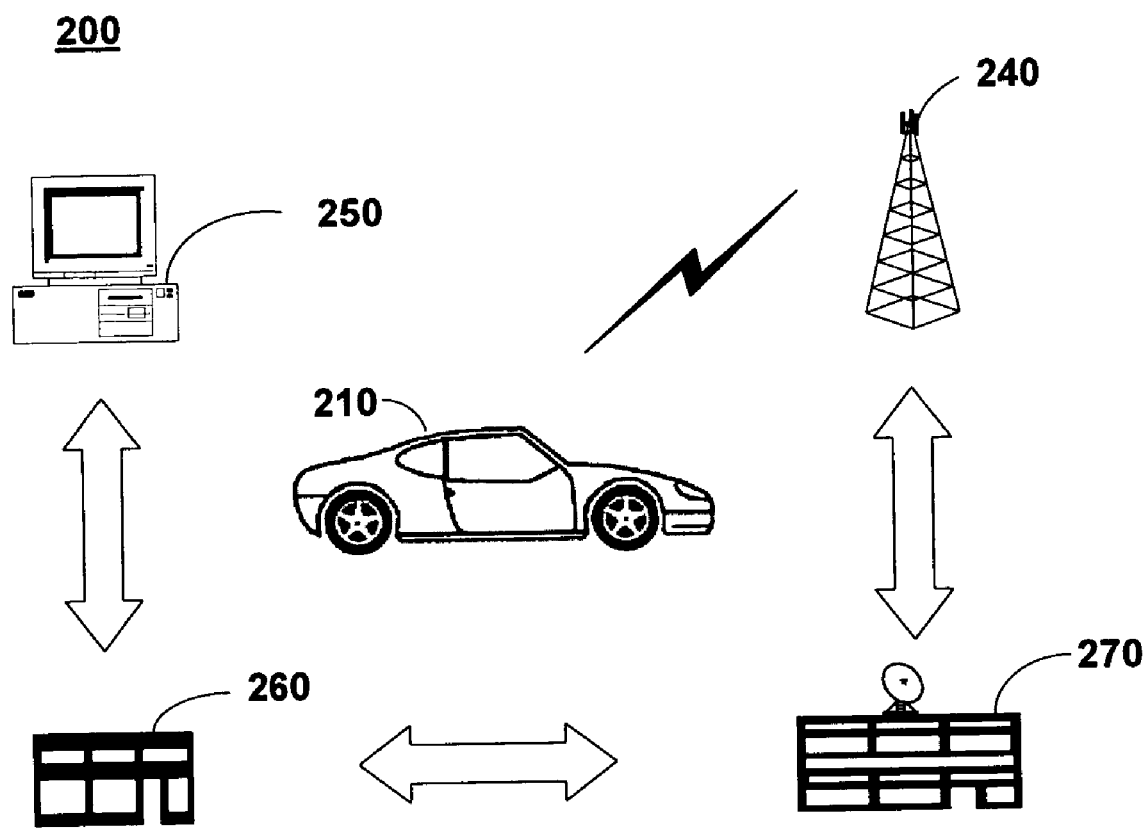
FIG. 2 illustrates another embodiment of a system for personalizing settings of an in-vehicle telematics unit and associated components, in accordance with the current invention.

FIG. 2 illustrates another embodiment of a system of personalizing settings for an in-vehicle telematics unit, in accordance with the current invention. The vehicle personalization system 200 comprises one or more mobile vehicles 210, one or more wireless carrier systems 240, one or more user computers 250, one or more web-hosting portals 260, and one or more call centers 270.

A driver, subscriber or user of a mobile vehicle utilizes personal or user computer 250 to access the website of web-hosting portal 260. The website comprises web pages organized by vehicle function, features available on a particular vehicle model, part of the vehicle needing service update, last updated user preference or any other convenient and user-friendly way of presenting the current settings of user preferences and options for changing those preferences. The server-side software secures information through user identification numbers, vehicle identification numbers, passwords, or any other identification process to insure that a person is an authorized user of a telematics service to a particular vehicle.

Options are presented in an organized manner for easy selection, for example, by clicking a radio button, check box, selection box or drop-down menu. In one embodiment, server-side and optionally client-side form validation are used to prevent the user from selecting unavailable, incorrect, or conflicting options of preferences. Examples of user preferences include seat behavior preference, a mirror behavior preference, a door lock behavior preference, a radio station preset selection preference, a climate setting preference, a button configuration preference, and a theft alarm setting preference, as well as other preferences and user options in an ever-increasing list of telematics and vehicle services.

In one embodiment, after new preferences have been selected, the user is asked to verify new preferences and user identification again before the web-hosting portal 260 sends the final selections to call center 270.

In another embodiment, after new preferences have been selected and the user has verified new preferences and user identification, the telematics unit of mobile vehicle 210 is queried to determine a download status of the mobile vehicle 210. In an example, the download status is a fixed status requiring the mobile vehicle maintain a stationary period for a predetermined fixed time period. In this example, certain new preferences, such as, for example modifying power train behavior (e.g. sport transmission shifting preference), seat behavior (e.g. remote exit preference) and mirror behavior (e.g. mirror to cub in reverse preference) include a requirement for a predetermined stationary period for implementation of the modification. In one embodiment, the download status is determined based on the ignition status of the mobile vehicle. In another example, the download status is a variable status requiring the mobile vehicle maintain a stationary period for a predetermined variable time period depending on the new preferences. In this example, certain new preferences, such as, for example modifying radio pre-sets include a requirement for a very limited stationary period or no stationary period for implementation of the preference.

If the download status of the telematics unit of mobile vehicle 210 is negative (e.g. the telematics unit inactive or the mobile vehicle is unable to maintain a stationary position for a specified time period), the preferences are stored for later transmission.

The web-hosting portal 260 sends user-preference information to the communication services manager of call center 270. The call center processes a telematics service request with updated user preferences to the mobile vehicle via a combination of one or more types of networks and wireless carrier system 240.

The telematics unit of mobile vehicle 210 receives the updated user-preference information, and activates the functions that send signals to electronic controllers and equipment to change vehicle parameters and service settings that correspond to the user preferences sent to the vehicle. In an example, the user-preference information includes seat-position, mirror-adjustment, radio-preset, dashboard-display, cell-phone and temperature-control settings that can be set before a driver ever enters a vehicle.

The system depicted in FIG. 2 also illustrates the path of updated user-preference information being transmitted from mobile vehicle 210 to call center 270 via wireless carrier system 240. In one embodiment, a driver is able to change one or more user preferences at mobile vehicle 210 where functions are activated to change vehicle parameters and settings to correspond to user preferences. The updated user-preferences are sent back to call center 270 for storage, such as, for example in a database. In another embodiment, a driver accesses information on the latest user-preference updates from web-hosting portal 260 via an Internet-connected personal computer 250. In yet another embodiment, user preferences are stored at the user or personal computer 250 based on user input at mobile vehicle 210.

Figure 3:
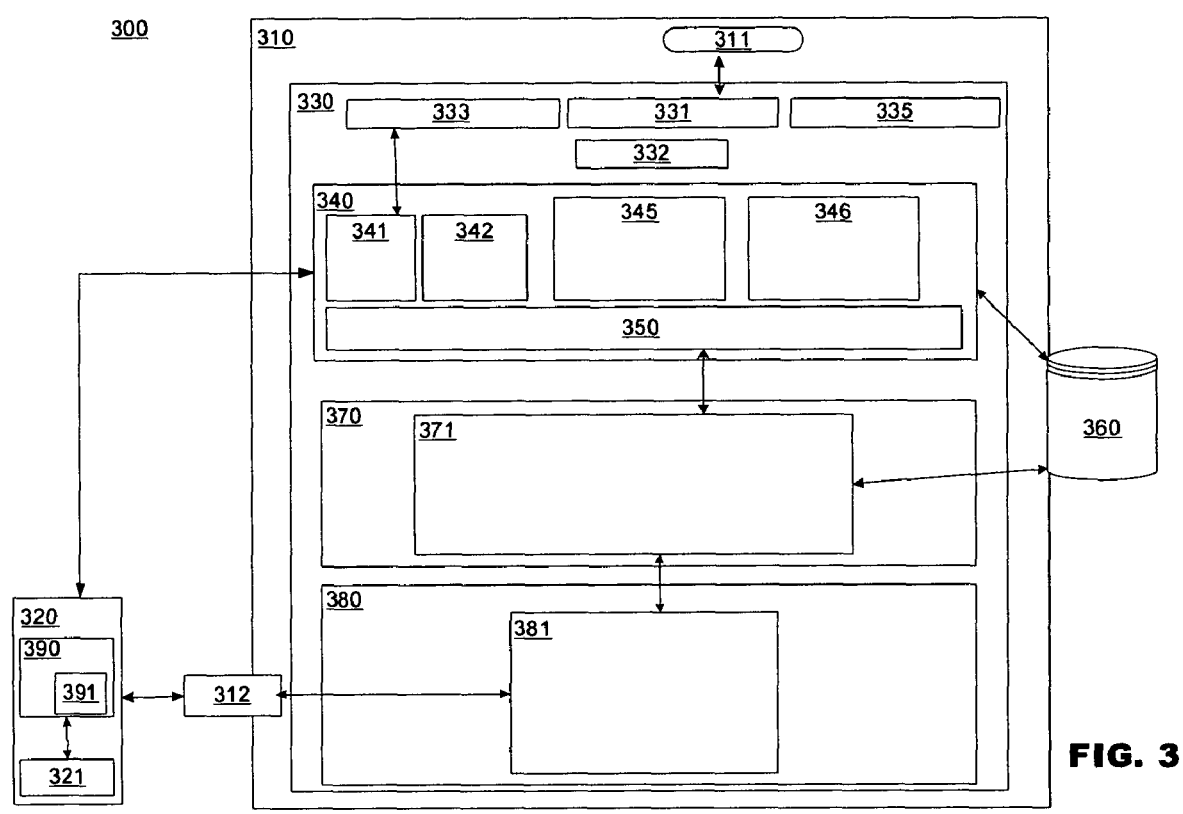
FIG. 3 is a block diagram illustrating a system for providing vehicle settings for a telematics unit and associated components in a mobile vehicle in accordance with one embodiment of the present invention.

FIG. 3 is a block diagram illustrating a system 300 for providing vehicle settings for a telematics unit in a mobile vehicle. System 300 includes a system server 310 and a vehicle client 320. System 300 may include additional components not relevant to the present discussion.

Server 310 is a server-side system that includes web-client application 311, modem bank 312, application server 330, and database 360. In one embodiment, server 310 is implemented as an OnStar® call center, such as, for example call center 170 of FIG. 1 above. Web-client application 311 is a portal allowing access to/from server 310 from outside sources, such as, for example the Internet and the World Wide Web. In one embodiment, web-client application 311 is implemented as an end user website, such as, for example web-hosting portal 160 of FIG. 1 above. Modem bank 312 allows server 310 to access vehicle client 320.

Vehicle client 320, also referred to as a telematics unit, includes a vehicle communication services (VCS) application 390 and vehicle bus 321. In one embodiment and referring to FIG. 1 above, VCS application 390 operates within telematics unit 120. VCS application 390 is a software framework that receives proprietary over-the-air messaging schemes and passes a vehicle setting update including updated vehicle settings to vehicle bus 321 for execution. In one embodiment, vehicle bus 321 executes the updated vehicle settings on components coupled to the vehicle bus, such as, for example a vehicle telematics unit, a vehicle personalization module, or a vehicle radio. VCS application 390 transmits to server 310 as well. In one embodiment, VCS application 390 communicates with server 310 as described in FIG. 1, above. VCS application 390 includes alert manager 391. Alert manager 391 manages the various sending/receiving of communications between vehicle client 320 and server 310. In one embodiment, alert manager 391 provides an interface allowing a user to communicate a request for a previously provided vehicle setting update to be transmitted from application server 330 to vehicle client 320. In another embodiment, alert manager 391 provides an interface notifying a user previously provided vehicle settings are ready to be transmitted from application server 330 to vehicle client 320.

Application server 330 is an Internet/World Wide Web application server operating within server 310 that facilitates operation of software applications operating within application server 330 as well as providing conduits into and out of application server 330. In one embodiment, application server 330 is implemented as a WebLogic application server available from BEA™ Systems, INC. of San Jose, Calif.

Database 360 receives and stores data from as well as locates and sends requested data to application server 330 and related applications operating within application server 330. In one embodiment, database 360 stores user profile information, such as, for example service-level information and vehicle type information including vehicle specific data as well as other relevant information discuss below. Database 360 may be implemented as any suitable database application, such as, for example Oracle® Database available from Oracle® Corp. of Redwood Shores, Calif.

Application server 330 includes portal application 340, common services application 370, and communication services application 380. Application server 330 further includes personal portal 331, portal skin 332, voice portal 333, and remote administrative portal 335. Personal portal 331 and remote administrative portal 335 are web-based software frameworks that allow interaction between a client and an application operating within application server 330. In one embodiment, personal portal 331 provides interaction between a customer and an application operating within application server 330 via the Internet/World Wide Web. In this embodiment, portal skin 332 functions to provide mapping to a specific user profile and provides links to specific applications within portal application 340 based on predetermined criteria, such as, for example a service-level subscription and vehicle type. In another embodiment, administrative portal 335 provides interaction between a call center advisor and an application operating within application server 330 via an intranet. In this embodiment, operation within an intranet reduces security concerns by promoting call center advisor communication directly with portal application 340.

Voice portal 333 is a voice-based software framework that allows interaction between a client and an application operating within application server 330 via communication components with portal application 340, such as, for example voice channel access port 341 and wireless channel access port 342. In one embodiment, voice portal 333 provides interaction between a customer and an application operating within application server 330 via a wireless carrier system. In this embodiment, portal skin 332 functions to provide mapping to a specific user profile and provides coupling to specific applications within portal application 340 based on predetermined criteria, such as, for example a service-level subscription and vehicle type. In an example, portal skin 332 operates in conjunction with voice portal 333 as a voice-activated menu allowing the customer to interact with specific applications within portal application 340 based on predetermined criteria, such as, for example a service-level subscription and vehicle type. In operation, utilizing system 300 allows a customer to interact with specific applications within portal application 340, such as, for example to request an update, called a vehicle settings update signal, of vehicle preferences.

Portal application 340 is a web-based software framework that creates interaction between a client and an application operating within the portal application. Portal application 340 includes voice channel access port 341, wireless channel access port 342, voice personalization portlet 345, web personalization portlet 346, and shared components 350. Voice channel access port 341 and wireless channel access port 342 are access ports that allow additional access avenues to portal application 340 for a client. In one example, voice channel access port 341 allows access to portal application 340 by a client via a voice channel device, such as, a cellular phone or other voice activated telecommunications device. In this example, voice channel access port 341 includes a voice XML gateway that includes automated speech recognition (ASR) software for facilitating communication with a user. In another example, wireless channel access port 342 allows access to portal application 340 by a client via a wireless device, such as, for example a Short Message Service (SMS) device or a Wireless Application Protocol (WAP) device.

Portlets (345 and 346) are applications that interact with a client and provide a client access to specific services based on predetermined criteria, such as, for example a service-level subscription and vehicle type. In one embodiment, the portlets make use of the portal software framework connection to application logic behind the user interface to allow execution of desired services. In an example, a portlet includes Java Server Pages (JSPs), webflows, and input processors to enable a client to access and interact with the portlet. In this example, if predetermined criteria have been met (e.g. security criteria), voice personalization portlet 345 provides a client access to her account, such as, for example to request a download to update vehicle settings. In another example, web personalization portlet 346 makes use of the portal software framework connection to application logic behind the graphical user interface (GUI) to allow execution of desired services. In an example, based on the service-level subscription and vehicle type, web personalization portlet 346 allows the client (e.g., the customer in this example) to enter portal application 340 via personal portal 331 and portal skin 332, and access web personalization portlet 346 to update vehicle settings.

Additionally, portal application 340 may include other applications, such as, for example an application that would notify a user of an update awaiting download by transmitting an update flag signal to a vehicle client. In one embodiment, the vehicle client 320 receives an update flag signal from portal application 340 via application server 330 at the alert manager 391 and notifies the client of the waiting vehicle setting update. In another embodiment, portal application 340 passes the update flag signal to shared components 350 for transmission to vehicle client 320 as described below.

Shared components 350 is an interface layer that collects portlet information and produces vehicle setting updates request, also referred to as vehicle service message requests. In one embodiment, shared components 350 produces a request object including vehicle setting updates and streams the request object to common services application 370 as described in (OnStar#GP-303672/CLG#2760.113) filed on Sep. 3, 2003.

Common services application 370 is a web-based software framework that supports interaction between applications operating within common services application 370 and applications operating within other web-based software frameworks, such as, for example portal application 340 and communication services application 380. Common services application 370 includes vehicle message service (VMS) application 371 that receives the request object from shared components 350, produces a vehicle setting update request, and streams the vehicle setting update request to communication services application 380. In one embodiment, VMS application 371 receives the request object from shared components 350, produces a vehicle service message request (i.e., a vehicle setting update request), and streams the vehicle service message requests to communication services application 380 as described in (OnStar#GP-303672/ CLG#2760.113) filed on Sep. 3, 2003

Communication services application 380 is a software framework that supports interaction between applications operating within communication services application 380 and applications operating within web-based software frameworks, such as, for example common services application 370. Communication services application 380 includes vehicle session manager (VSM) application 381 that receives a vehicle setting update from VMS application 371 and passes the vehicle setting update to modem bank 312 for transmission to vehicle client 320. In one embodiment, VSM application 381 receives the vehicle service message request (i.e., a vehicle setting update) and passes the vehicle setting update to modem bank 312 for transmission to vehicle client 320 as described in (OnStar#GP-303672/CLG#2760.113) filed on Sep. 3, 2003

In operation, updated vehicle settings are received via web-client application 311 and personal portal 331, voice portal 333, or remote administrative portal 335, in conjunction with portal skin 332 to access portlets (345 and 346). In one embodiment, updated vehicle settings are referred to as user-preference information. Shared components 350 creates a vehicle setting update request that is streamed to VMS application 371 within common services application 370. VMS application 371 produces vehicle setting update that is streamed to VSM application 381. VSM application 381 passes the vehicle setting update to modem bank 312 for transmission to vehicle client 320.

Figure 4:
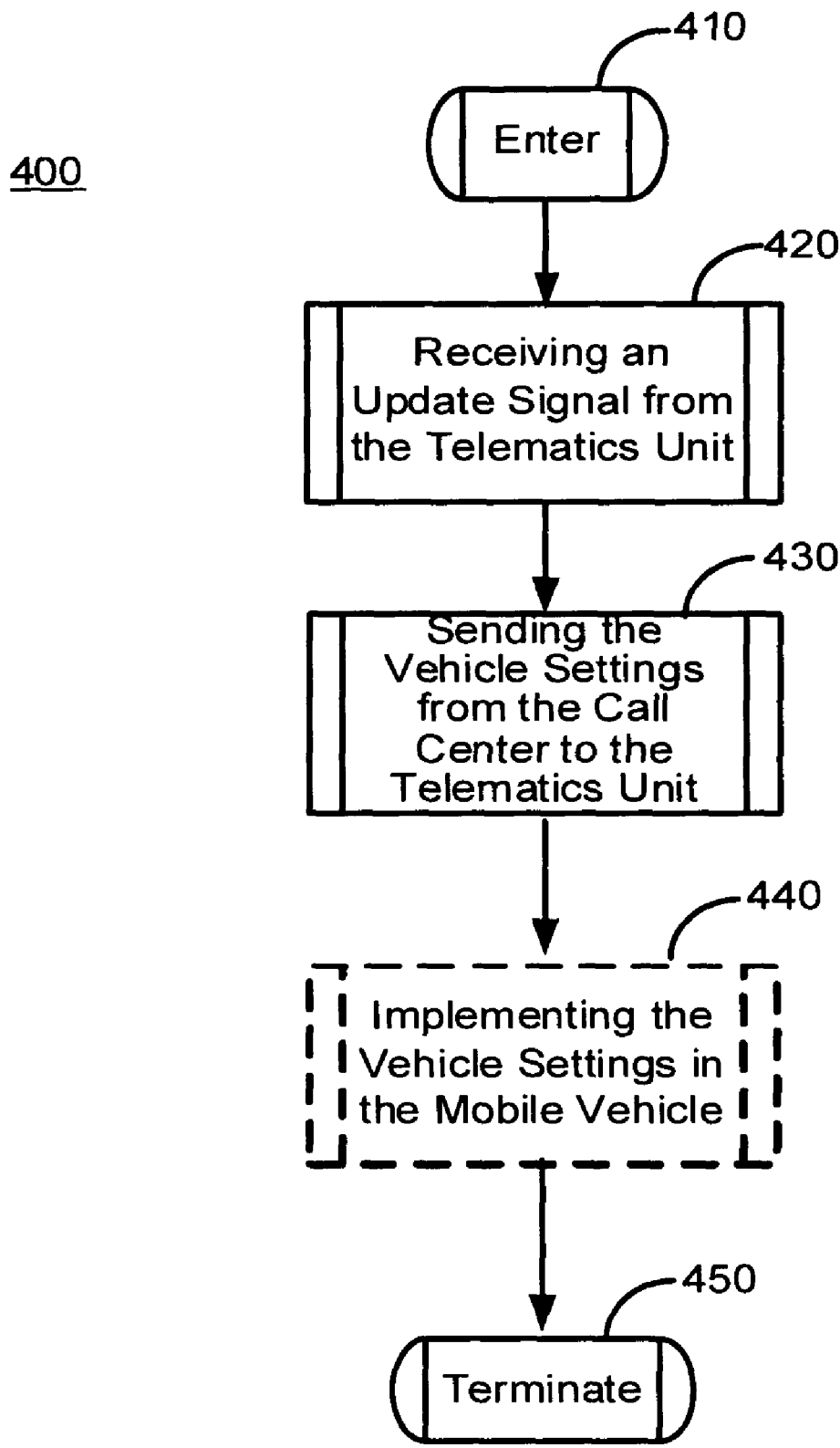
FIG. 4 is a flow diagram of one embodiment of a method of personalizing settings for an in-vehicle telematics unit and associated components, in accordance with the current invention.
Figure 5:
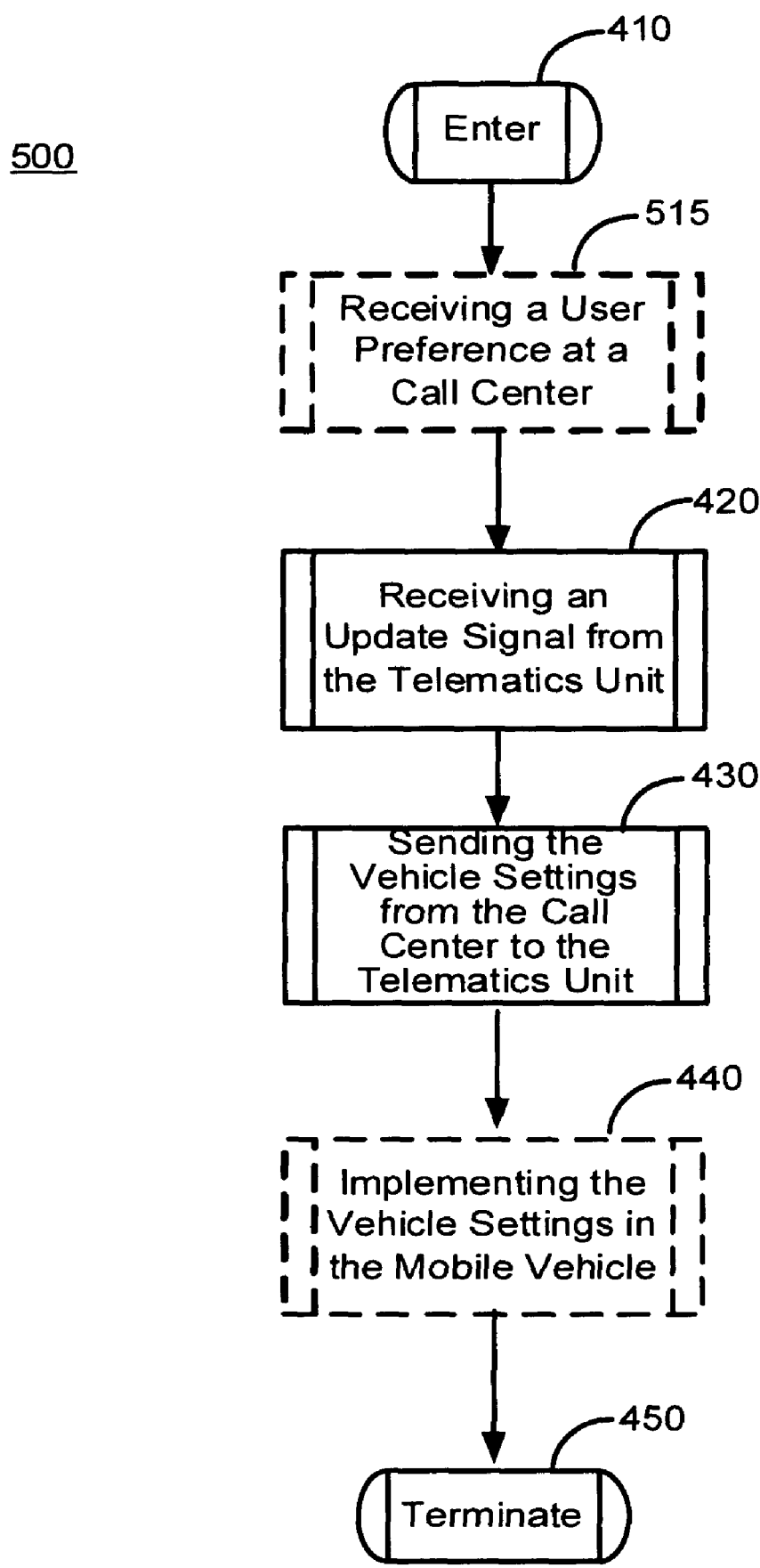
FIG. 5 is a flow diagram of another embodiment of a method of personalizing settings for an in-vehicle telematics unit and associated components, in accordance with the current invention.
Figure 6:
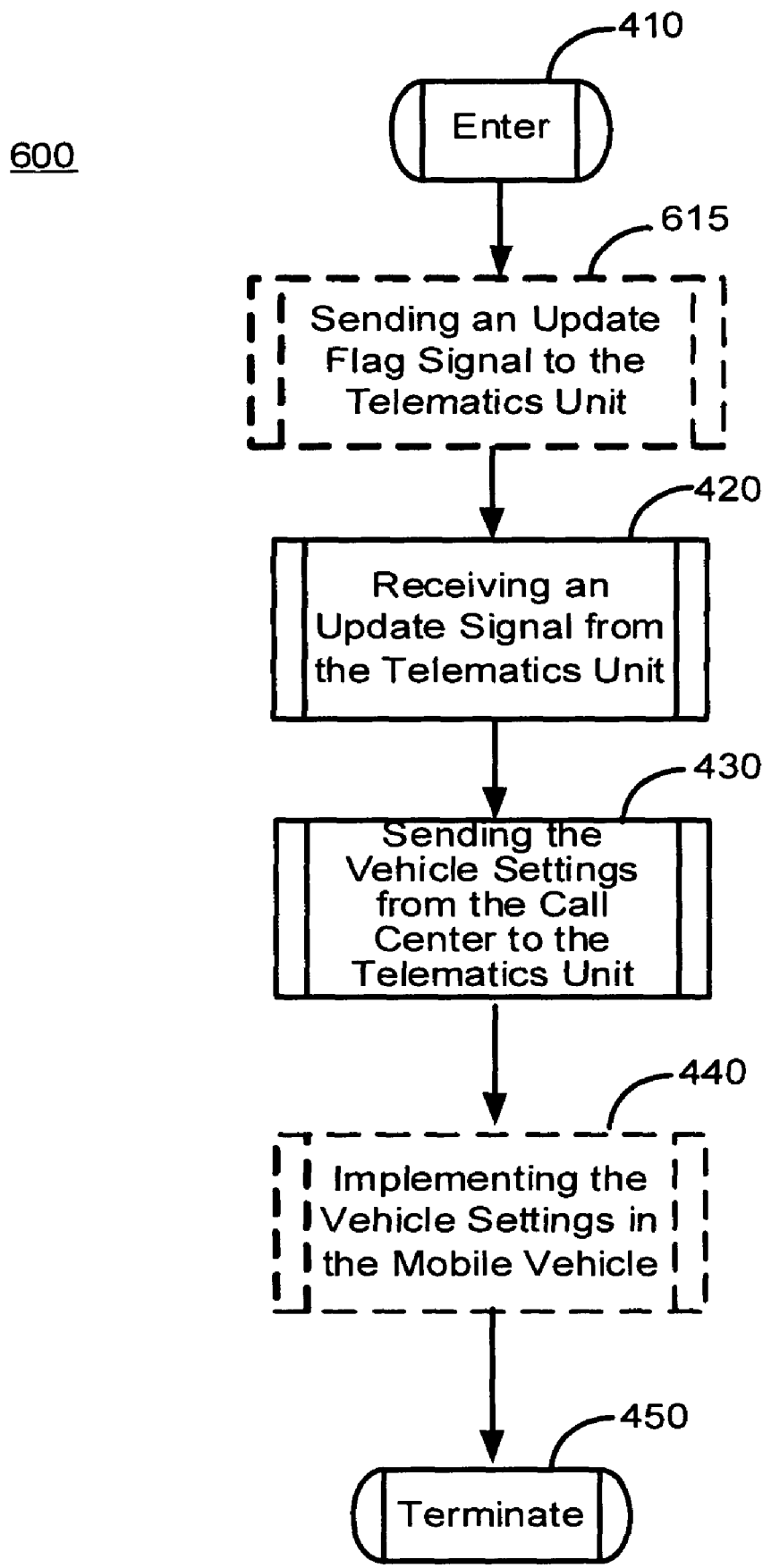
FIG. 6 is a flow diagram of yet another embodiment of a method of personalizing settings for an in-vehicle telematics unit and associated components, in accordance with the current invention.

FIGS. 4-6 are flow diagrams of embodiments of a method of personalizing settings for an in-vehicle telematics unit. In FIGS. 4-6, methods 400, 500, and 600 may utilize one or more systems detailed in FIGS. 1-3 above. The present invention can also take the form of a computer usable medium including a program for configuring an electronic module within a vehicle. The program stored in the computer usable medium comprises computer program code for executing the method steps described in FIGS. 4-6. In FIG. 4, method 400 begins at block 410. Blocks in FIGS. 5 and 6 that are numbered identically to blocks in FIG. 4 function in a substantially similar way.

At block 420, a vehicle settings update signal is received. In one embodiment, the vehicle settings update signal is received at a call center, such as, for example call center 170 described in FIG. 1 above. In another embodiment, the vehicle settings update signal is received at application server operating within a server from a telematics unit. In an example and referring to FIG. 3, the vehicle settings update signal is received at application server 330 operating within server 310 from vehicle client 320. In this example, the vehicle settings update signal is implemented as a voice signal that enters voice portal 333 of application server 330 to reach voice portlet 345 within portal application 340 as described above. Alternatively, the vehicle settings update signal is implemented as a voice signal that enters voice channel access port 341 or a data signal that enters wireless channel access port 342 of portal application 340 to reach portlets (345 and 346) within portal application 340 as described above.

At block 430, vehicle settings are sent from the call center to the telematics unit. In one embodiment, vehicle settings are sent from the call center, such as, for example call center 170 described in FIG. 1 above, to the telematics unit, such as, for example telematics unit 120 described in FIG. 1 above. In an example and referring to FIG. 3 above, shared components 350 creates a vehicle setting update request that is streamed to VMS application 371 within common services application 370. VMS application 371 produces vehicle setting update that is streamed to VSM application 381. VSM application 381 passes the vehicle setting update to modem bank 312 for transmission to vehicle client 320.

In another embodiment, sending the vehicle settings from the call center to the telematics unit includes determining a download status of the telematics unit, storing the vehicle settings when the download status of the telematics unit is negative, and transmitting the vehicle settings from the call center to the telematics unit when the download status of the telematics unit is positive. In an example and referring to FIG. 1 above, vehicle settings are sent from the call center 170 to telematics unit 120 when the telematics unit is active.

In another example and referring to FIG. 3 above, vehicle client 320 is in bi-directional communication with application server 330. In this example, voice portal 333 (via voice channel access port 341 within portal application 340) provides interaction between a customer as well as vehicle client 320 and an application (e.g. voice personalization portlet 345 within portal application 340) operating within application server 330 via a wireless carrier system to determine the download status of VCS application 390 and hence the download status of the telematics unit that VCS application 390 operating within. An example of determining the download status of the telematics unit includes transmitting at least one download requirement to the telematics unit, receiving a download reply from the telematics unit responsive to the at least one download requirement, and determining a download status of the telematics unit based on the received download reply.

An example of a download requirement includes an active telematics unit and the active telematics unit monitoring a plurality of associated components and their statuses, such as, for example, a vehicle personalization module, a vehicle radio, a transmission status, or an ignition status of the vehicle, for example an ignition status of accessory/remote accessory power (RAP). In this example, the download requirement ensures that components within the telematics unit and the vehicle are in a state allowing for modification.

If the download status of the telematics unit is negative (e.g. the telematics unit is inactive or the telematics unit is active but associated components are in an unmodifiable state), portal application 340 instructs shared components 350 to transfer the vehicle setting update request to database 360 for storage. If the download status of the telematics is positive (e.g. the telematics unit active and components are in a modifiable state), portal application 340 instructs shared components 350 to stream the vehicle setting update request to VMS application 371 as described in FIG. 3 above.

Further, if storage is required, the step of storing the vehicle setting update request includes determining a store status for the vehicle settings when the download status of the telematics unit is negative, storing the vehicle settings when the store status is positive, and deleting the vehicle settings when the store status is negative. In an example and referring to FIG. 3, the step of determining the store status includes voice portal 333 providing interaction between a customer as well as vehicle client 320 and an application (e.g. voice personalization portlet 345 within portal application 340) operating within application server 330 via a wireless carrier system.

At optional block 440, the updated vehicle settings within the vehicle setting update are implemented within the vehicle client. In one embodiment and described in FIG. 3 above, VCS application 390 passes the vehicle setting update to vehicle bus 321 for implementation.

At block 450, the method ends.

In FIG. 5, method 500 includes optional block 515 in addition to blocks 410-450 described in FIG. 4 above. At block 515, a user preference is received at a call center. In one embodiment, user preferences in the form of updated vehicle settings are received via a web-client application and a personal portal, a voice portal, or a remote administrative portal, in conjunction with a portal skin to access portlets. In an example and referring to FIG. 3 above, user preferences in the form of updated vehicle settings are received via web-client application 311 and personal portal 331, voice portal 333, or remote administrative portal 335, in conjunction with portal skin 332 to access portlets (345 and 346).

In FIG. 6, method 600 includes optional block 615 in addition to blocks 410-450 described in FIG. 4 above. At block 615, an update flag signal is sent to the telematics unit. In one embodiment, the telematics unit, also referred to as a vehicle client, receives an update flag signal from a portal application via an application server at an alert manager and notifies the client of the waiting vehicle setting update. In an example and referring to FIG. 3 above, vehicle client 320 receives an update flag signal from portal application 340 via application server 330 and through modem 312 at alert manager 391 and notifies the client of the waiting vehicle setting update. In another embodiment, the portal application passes the update flag signal to shared components interface layer for transmission to a vehicle client. In an example and referring to FIG. 3 above, portal application 340 passes the update flag signal to shared components 350 for transmission to vehicle client 320.

The above methods (400, 500, and 600) may be further combined to form a method including the steps of method 400 as well as block 515 of method 500 and block 615 of method 600. In one embodiment, the resultant method would include receiving a user preference at a call center and transmitting an update flag signal to the telematics unit prior to execution of the steps of method 400.

The above-described methods and implementation for providing vehicle settings for a telematics unit in a mobile vehicle are example methods and implementations. These methods and implementations illustrate one possible approach for providing vehicle settings for a telematics unit in a mobile vehicle. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

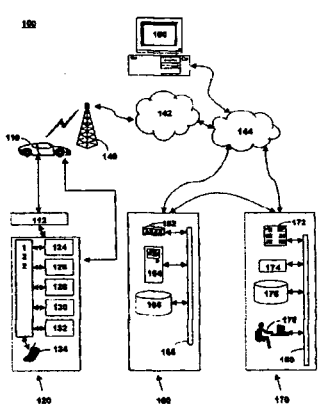

What is claimed is:

1. A system for providing vehicle settings for a telematics unit in a mobile vehicle, the system comprising:
   a call center configured to receive a vehicle settings update signal from the telematics unit;
   a voice portal configured to provide interaction between the mobile vehicle and an application operating within an application server at the call center to determine a download status of the telematics unit and associated components, wherein the download status is a fixed status requiring the mobile vehicle to maintain a stationary period for a predetermined fixed time period;
   a database for storing the vehicle settings when the download status of the telematics unit and associated components is negative; and
   a modem bank for transmitting the vehicle settings from the call center to the telematics unit when the download status of the telematics unit and associated components is positive, wherein if the download status is positive, the mobile vehicle has maintained the stationary position for the predetermined fixed time period, and wherein the transmitted vehicle settings are selected from modifying power train behavior, modifying seat behavior, modifying mirror behavior, and combinations thereof.

2. The system of claim 1 wherein the telematics unit comprises:
- a vehicle bus configured to implement the vehicle settings in the mobile vehicle; and
- a vehicle communications services applications configured to receive the vehicle settings from the call center and to pass the vehicle settings to the vehicle bus.

3. The system of claim 1, further comprising:
- a web portal interface configured to transmit at least one user preference to the call center prior to the call center receiving the vehicle settings update signal.

4. The system of claim 1, wherein the telematics unit determines whether the associated components are in a modifiable state.

5. The system of claim 1 wherein the
- voice portal is further configured to provide the interaction between the mobile vehicle and the application operating within the application server at the call center to determine a store status for the vehicle settings when the download status of the telematics unit and associated components is negative.

* * * * *

UNITED STATES PATENT AND TRADEMARK OFFICE
CERTIFICATE OF CORRECTION

| | | |
|---|---|---|
| PATENT NO. | : 7,840,322 B2 | Page 1 of 3 |
| APPLICATION NO. | : 10/654301 | |
| DATED | : November 23, 2010 | |
| INVENTOR(S) | : Steven J. Ross, Stephen C. Habermas and Christopher L. Oesterling | |

It is certified that error appears in the above-identified patent and that said Letters Patent is hereby corrected as shown below:

PLEASE ADD THE FOLLOWING CLAIMS, NOS. 6-14

Col. 14 lines 11-23
    6. A method for providing vehicle settings to a telematics unit in a mobile vehicle, the method comprising:
        receiving a vehicle settings update signal at a call center from the telematics unit;
        via a voice portal, providing interaction between the mobile vehicle and an application operating within an application server at the call center to determine a download status of the telematics unit and associated components, wherein the download status is a fixed status requiring the mobile vehicle to maintain a stationary period for a predetermined fixed time period;
        storing, via a database, the vehicle settings when the download status of the telematics unit and associated components is negative; and
        transmitting, via a modem bank, the vehicle settings from the call center to the telematics unit when the download status of the telematics unit and associated components is positive, wherein if the download status is positive, the mobile vehicle has maintained the stationary position for the predetermined fixed time period, and wherein the transmitted vehicle settings are selected from modifying power train behavior, modifying seat behavior, modifying mirror behavior, and combinations thereof.

Col. 14 lines 24-25
    7. The method of claim 6, further comprising:
    implementing the vehicle settings in the mobile vehicle.

Col. 14 lines 26-28
    8. The method of claim 6, further comprising:
    receiving at least one user preference at a call center via a web portal interface prior to the call center receiving the vehicle settings update signal.

Signed and Sealed this
Twenty-sixth Day of July, 2011

David J. Kappos
*Director of the United States Patent and Trademark Office*

Col. 14 lines 29-35

9. A method for providing vehicle personalization settings to a telematics unit in a mobile vehicle, the method comprising:

sending an update flag signal from a call center to a telematics unit, the update flag signal indicating that a vehicle personalization setting update is available for download;

after the update flag signal is sent, receiving a vehicle personalization settings update signal at a call center from the telematics unit;

via a voice portal, providing interaction between the mobile vehicle and an application operating within an application server at the call center to determine a download status of the telematics unit and associated components, wherein the download status is a fixed status requiring the mobile vehicle to maintain a stationary period for a predetermined fixed time period;

storing, via a database, the vehicle personalization settings when the download status of the telematics unit and associated components is negative; and sending, via a modem bank, vehicle personalization settings from the call center to the telematics unit responsive to the vehicle personalization settings update signal and when the download status of the telematics unit and associated components is positive, wherein if the download status is positive, the mobile vehicle has maintained the stationary position for the predetermined fixed time period, wherein the vehicle personalization settings correspond to the vehicle personalization settings update and wherein the sent vehicle personalization settings are selected from modifying power train behavior, modifying seat behavior, modifying mirror behavior, and combinations thereof.

Col. 15 lines 1-13

10. A method for providing vehicle personalization settings to a telematics unit in a mobile vehicle, the method comprising:

receiving at least one user preference of a vehicle setting at a call center via a web portal interface;

sending an update flag signal from the call center to the telematics unit responsive to receiving the at least one user preference at the call center via the web portal interface, the update flag signal indicating that a vehicle setting update is available for download;

then receiving a vehicle settings update signal at the call center from the telematics unit;

via a voice portal, providing interaction between the mobile vehicle and an application operating within an application server at the call center to determine a download status of the telematics unit and associated components, wherein the download status is a fixed status requiring the mobile vehicle to maintain a stationary period for a predetermined fixed time period;

storing, via a database, the vehicle settings when the download status of the telematics unit and associated components is negative; and sending, via a modem bank, at least one vehicle setting corresponding to the user preference from the call center to the telematics unit responsive to the update signal and when the download status of the telematics unit and associated components is positive, wherein if the download status is positive, the mobile vehicle has maintained the stationary position for the predetermined fixed time period, and wherein the transmitted vehicle settings are selected from modifying power train behavior, modifying seat behavior, modifying mirror behavior, and combinations thereof.

CERTIFICATE OF CORRECTION (continued)
U.S. Pat. No. 7,840,322 B2

Col. 15 lines 20-37

11. A method for providing vehicle personalization settings to a telematics unit in a mobile vehicle, the method comprising;
   receiving a vehicle personalization settings update signal at a call center from the telematics unit;
   transmitting at least one download requirement to the telematics unit, the download requirement indicating, to the telematics unit, an in-vehicle component needed in a modifiable state for a successful download of a vehicle personalization setting associated with the vehicle personalization settings update signal;
   receiving a download reply from the telematics unit responsive to the at least one download requirement;
   via a voice portal, providing interaction between the mobile vehicle and an application operating within an application server at the call center to determine a download status of the telematics unit and the component based on the received download reply, wherein the download status is a fixed status requiring the mobile vehicle to maintain a stationary period for a predetermined fixed time period;
   storing the vehicle setting when the download status of the telematics unit and the component is negative;
and
   transmitting the vehicle personalization setting from the call center to the telematics unit when the download status of the telematics unit and the component is positive, wherein if the download status is positive, the mobile vehicle has maintained the stationary position for the predetermined fixed time period, and wherein the transmitted vehicle personalization settings are selected from modifying power train behavior, modifying seat behavior, modifying mirror behavior, and combinations thereof.

Col. 15 lines 38-40

12. The method of claim 11, further comprising:
   determining, via the telematics unit, that the component is in the modifiable state; and
   transmitting the download reply indicating that the component is in the modifiable state.

Col. 15 lines 41-45

13. The method of claim 11, wherein storing the vehicle setting comprises:
   determining a store status for the vehicle setting when the download status of the telematics unit and the component is negative;
   storing the vehicle settings when the store status is positive; and
   deleting the vehicle settings when the store status is negative.

Col. 15 lines 46-47

14. The method of claim 11 wherein the download requirement specifies that at least one of a vehicle personalization module, a vehicle radio, a vehicle transmission, or a vehicle ignition is in the modifiable state.

UNITED STATES PATENT AND TRADEMARK OFFICE
CERTIFICATE OF CORRECTION

PATENT NO. : 7,840,322 B2  
APPLICATION NO. : 10/654301  
DATED : November 23, 2010  
INVENTOR(S) : Steven J. Ross, Stephen C. Habermas and Christopher L. Oesterling It is certified that error appears in the above-identified patent and that said Letters Patent is hereby corrected as shown below:

Delete the title page and substitute therefore the attached title page showing the corrected number of claims in the patent.

PLEASE ADD THE FOLLOWING CLAIMS, NOS. 6-14  
Col. 14 lines 11-23

6. A method for providing vehicle settings to a telematics unit in a mobile vehicle, the method comprising:

receiving a vehicle settings update signal at a call center from the telematics unit;

via a voice portal, providing interaction between the mobile vehicle and an application operating within an application server at the call center to determine a download status of the telematics unit and associated components, wherein the download status is a fixed status requiring the mobile vehicle to maintain a stationary period for a predetermined fixed time period;

storing, via a database, the vehicle settings when the download status of the telematics unit and associated components is negative; and transmitting, via a modem bank, the vehicle settings from the call center to the telematics unit when the download status of the telematics unit and associated components is positive, wherein if the download status is positive, the mobile vehicle has maintained the stationary position for the predetermined fixed time period, and wherein the transmitted vehicle settings are selected from modifying power train behavior, modifying seat behavior, modifying mirror behavior, and combinations thereof.

Col. 14 lines 24-25

7. The method of claim 6, further comprising:  
    implementing the vehicle settings in the mobile vehicle.

This certificate supersedes the Certificate of Correction issued July 26, 2011.

Signed and Sealed this  
Twenty-third Day of August, 2011

David J. Kappos  
*Director of the United States Patent and Trademark Office*

Col. 14 lines 26-28

8. The method of claim 6, further comprising:
receiving at least one user preference at a call center via a web portal interface prior to the call center receiving the vehicle settings update signal.

Col. 14 lines 29-35

9. A method for providing vehicle personalization settings to a telematics unit in a mobile vehicle, the method comprising:
sending an update flag signal from a call center to a telematics unit, the update flag signal indicating that a vehicle personalization setting update is available for download;
after the update flag signal is sent, receiving a vehicle personalization settings update signal at a call center from the telematics unit;
via a voice portal, providing interaction between the mobile vehicle and an application operating within an application server at the call center to determine a download status of the telematics unit and associated components, wherein the download status is a fixed status requiring the mobile vehicle to maintain a stationary period for a predetermined fixed time period;
storing, via a database, the vehicle personalization settings when the download status of the telematics unit and associated components is negative; and
sending, via a modem bank, vehicle personalization settings from the call center to the telematics unit responsive to the vehicle personalization settings update signal and when the download status of the telematics unit and associated components is positive, wherein if the download status is positive, the mobile vehicle has maintained the stationary position for the predetermined fixed time period, wherein the vehicle personalization settings correspond to the vehicle personalization settings update and wherein the sent vehicle personalization settings are selected from modifying power train behavior, modifying seat behavior, modifying mirror behavior, and combinations thereof.

Col. 15 lines 1-13

10. A method for providing vehicle personalization settings to a telematics unit in a mobile vehicle, the method comprising:
receiving at least one user preference of a vehicle setting at a call center via a web portal interface;
sending an update flag signal from the call center to the telematics unit responsive to receiving the at least one user preference at the call center via the web portal interface, the update flag signal indicating that a vehicle setting update is available for download;
then receiving a vehicle settings update signal at the call center from the telematics unit;
via a voice portal, providing interaction between the mobile vehicle and an application operating within an application server at the call center to determine a download status of the telematics unit and associated components, wherein the download status is a fixed status requiring the mobile vehicle to maintain a stationary period for a predetermined fixed time period;
storing, via a database, the vehicle settings when the download status of the telematics unit and associated components is negative; and
sending, via a modem bank, at least one vehicle setting corresponding to the user preference from the call center to the telematics unit responsive to the update signal and when the download status of the telematics unit and associated components is positive, wherein if the download status is positive, the mobile vehicle has maintained the stationary position for the predetermined fixed time period, and wherein the transmitted vehicle settings are selected from modifying power train behavior, modifying seat behavior, modifying mirror behavior, and combinations thereof.

Col. 15 lines 20-37

11. A method for providing vehicle personalization settings to a telematics unit in a mobile vehicle, the method comprising;
    receiving a vehicle personalization settings update signal at a call center from the telematics unit;
    transmitting at least one download requirement to the telematics unit, the download requirement indicating, to the telematics unit, an in-vehicle component needed in a modifiable state for a successful download of a vehicle personalization setting associated with the vehicle personalization settings update signal;
    receiving a download reply from the telematics unit responsive to the at least one download requirement;
    via a voice portal, providing interaction between the mobile vehicle and an application operating within an application server at the call center to determine a download status of the telematics unit and the component based on the received download reply, wherein the download status is a fixed status requiring the mobile vehicle to maintain a stationary period for a predetermined fixed time period;
    storing the vehicle setting when the download status of the telematics unit and the component is negative;
and
    transmitting the vehicle personalization setting from the call center to the telematics unit when the download status of the telematics unit and the component is positive, wherein if the download status is positive, the mobile vehicle has maintained the stationary position for the predetermined fixed time period, and wherein the transmitted vehicle personalization settings are selected from modifying power train behavior, modifying seat behavior, modifying mirror behavior, and combinations thereof.

Col. 15 lines 38-40

12. The method of claim 11, further comprising:
    determining, via the telematics unit, that the component is in the modifiable state; and
    transmitting the download reply indicating that the component is in the modifiable state.

Col. 15 lines 41-45

13. The method of claim 11, wherein storing the vehicle setting comprises:
    determining a store status for the vehicle setting when the download status of the telematics unit and the component is negative;
    storing the vehicle settings when the store status is positive; and
    deleting the vehicle settings when the store status is negative.

Col. 15 lines 46-47

14. The method of claim 11 wherein the download requirement specifies that at least one of a vehicle personalization module, a vehicle radio, a vehicle transmission, or a vehicle ignition is in the modifiable state.

CERTIFICATE OF CORRECTION (continued)

(12) United States Patent
Ross et al.

(10) Patent No.: US 7,840,322 B2
(45) Date of Patent: Nov. 23, 2010

(54) METHOD AND SYSTEM FOR IMPLEMENTING VEHICLE PERSONALIZATION

(75) Inventors: Steven J. Ross, Livonia, MI (US); Stephen C. Habermas, Needham, MA (US); Christopher L. Oesterling, Troy, MI (US)

(73) Assignee: General Motors LLC, Detroit, MI (US)

( * ) Notice: Subject to any disclaimer, the term of this patent is extended or adjusted under 35 U.S.C. 154(b) by 971 days.

(21) Appl. No.: 10/654,301

(22) Filed: Sep. 3, 2003

(65) Prior Publication Data
US 2004/0044454 A1    Mar. 4, 2004

Related U.S. Application Data

(63) Continuation-in-part of application No. 10/193,799, filed on Jul. 12, 2002, now abandoned.

(51) Int. Cl.
*G06F 7/00* (2006.01)
(52) U.S. Cl. ............... 701/36; 701/24; 701/45; 701/49; 701/54; 340/988; 455/152.1; 455/151.1
(58) Field of Classification Search ............... 701/49, 701/36, 209–213, 20, 24, 45, 54; 715/788; 340/988; 455/152.1, 41, 152, 151.1
See application file for complete search history.

(56) References Cited

U.S. PATENT DOCUMENTS 6,088,653 A  *  7/2000  Sheikh et al. ............... 701/214
6,493,743 B2 * 12/2002  Suzuki ....................... 709/203

(Continued)

FOREIGN PATENT DOCUMENTS

CN    101098342 A  *  1/2008
DE    102007029597 A1 *  2/2008

OTHER PUBLICATIONS

The Virtual Automation Lab-Web based teaching of automation engineering concepts; Buhler, D.; Kuchlin, W.; Grubler, G.; Nusser, G.; Engineering of Computer Based Systems, 2000. (ECBS 2000) Proceedings. Seventh IEEE International Conference and Workshopon the; Apr. 3-7, 2000 pp. 156-164; Digital Object Identifier 10.1109/ECBS.2000.839873.*

Asynchronous web-based patient-centered home telemedicine system; Lau, C.; Churchill, R.S.; Kim, J.; Matsen, F.A., III; Yongmin Kim; Biomedical Engineering, IEEE Transactions on; vol. 49, Issue 12, Part 1, Dec. 2002 pp. 1452-1462 Digital Object Identifier 10.1109/TBME.2002.805456.*

From location databases to pervasive catalog; Chrysanthis, P.K.; Zadorozhny, V.I.; Database and Expert Systems Applications, 2002. Proceedings. 13th International Workshop on; Sep. 2-6, 2002 pp. 739-744.*

PDAs in medical education and practice; Smordal, O.; Gregory, J.; Langseth, K.J.; Wireless and Mobile Technologies in Education, 2002. Proceedings. IEEE International Workshop on; Aug. 29-30, 2002 pp. 140-146; Digital Object Identifier 10.1109/WMTE.2002.1039237.*

(Continued)

*Primary Examiner*—Cuong H Nguyen
(74) *Attorney, Agent, or Firm*—Dierker & Associates, P.C.

(57) ABSTRACT

The present invention provides a method for providing vehicle settings to a telematics unit in a mobile vehicle that includes receiving a vehicle settings update signal at a call center from the telematics unit and sending vehicle settings from the call center to the telematics unit. The method may additionally include implementing the vehicle settings in the mobile vehicle. The method may further include sending an update flag signal from the call center to the telematics unit. The method may additionally include receiving at least one user preference at the call center via a web portal interface. The step of receiving at least one user preference may further include sending an update flag signal from the call center to the telematics unit responsive to receiving the at least one user preference at the call center via the web portal interface.

14 Claims, 6 Drawing Sheets